United States Patent [19]

Irwin et al.

[11] 4,075,904
[45] Feb. 28, 1978

[54] ADAPTER FOR PUSH-PULL CONTROL CABLES

[75] Inventors: Steve Irwin, Seattle, Wash.; Dick Moser, Stow, Ohio

[73] Assignee: Incom International Inc., Pittsburgh, Pa.

[21] Appl. No.: 558,053

[22] Filed: Mar. 13, 1975

[51] Int. Cl.² ............................................. F16C 1/10
[52] U.S. Cl. ................................................. 74/501 P
[58] Field of Search ............ 74/501 R, 501 P, 480 B; 64/3, 4; 285/61, 62, 305

[56] References Cited

U.S. PATENT DOCUMENTS

| 3,263,948 | 8/1966 | Conrad | 74/501 P |
| 3,546,962 | 12/1970 | Ruhala | 74/501 R |
| 3,768,844 | 10/1973 | Goward et al. | 285/305 X |
| 3,913,954 | 10/1975 | Klimpl | 285/305 X |

Primary Examiner—Samuel Scott
Assistant Examiner—Frank H. McKenzie, Jr.
Attorney, Agent, or Firm—James C. Wray

[57] ABSTRACT

An adapter for attachment to a push-pull control cable, the control cable having a conduit slidably supporting a motion transmitting core, an end fitting attached to the conduit and coaxial therewith, the end fitting having an annular groove therein, the adapter comprising a substantially "L" shaped member, the longer leg of the member having a longitudinally extending bore therethrough for fitting over and accommodating the end fitting at least one hole through the leg perpendicular to the bore and in alignment with the annular groove, fastening means adapted to be inserted within the hole to engage the end fitting at its annular groove, to positionally fix in an axial direction the adapter on the end fitting.

26 Claims, 5 Drawing Figures

U.S. Patent        Feb. 28, 1978        4,075,904
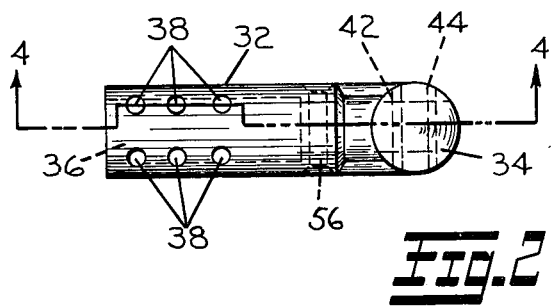
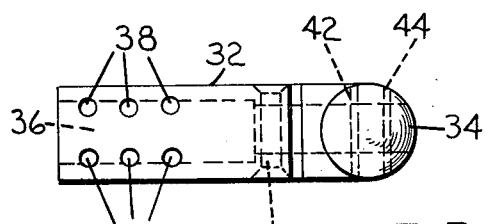
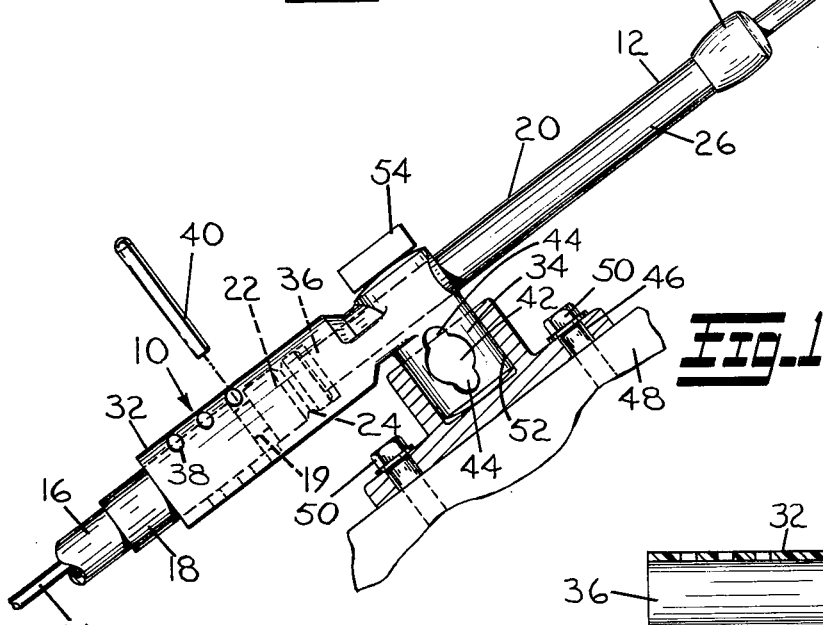
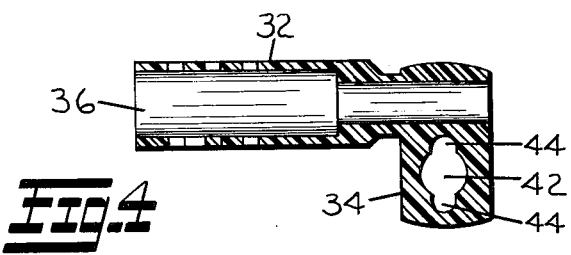
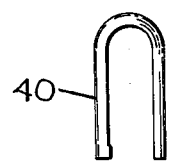

ADAPTER FOR PUSH-PULL CONTROL CABLES

BACKGROUND OF THE INVENTION

This invention relates generally to push-pull type cables and adapters therefor. More specifically, the present invention relates to push-pull cables primarily adapted to control the marine engine and transmissions therefor.

The Society of Automotive Engineers has specified the standard configurations for this type cable which has been designated by the Morse Controls Division, Rockwell International Corporation as a 33C push-pull control cable. Such a cable is shown on Page 29 of our catalog No. 74.

The above-noted standard type push-pull control cable must be adapted to a number of applications, including different engines and transmissions of a number of different manufacturers. For example, the push-pull control cable must be adapted to control the throttle and transmission of Evinrude, Johnson, Mercury and other engine and motor types. This has been accomplished in the past by the provision of a number of different and special clamps, pins, fasteners and the like. This, therefore, requires that boat builders, suppliers and maintenance personnel must inventory a myriad number of parts which is expensive in terms of inventory, cost and administration. Furthermore, the wide range of inventory parts increases the possibility and probability that the push-pull control cable might be operatively attached to the throttle or clutch linkage in an inappropriate or unsuitable manner. Such an unsuitable operative attachment of the push-pull control cable to a throttle or transmission linkage could result in damage to various motor parts.

SUMMARY OF THE INVENTION

It is therefore a primary object of the present invention to provide an adapter for attachment to a push-pull control cable, said control cable having a conduit slidably supporting a motion transmitting core, an end fitting attached to said conduit and coaxial therewith, said end fitting having an annular groove therein, said adapter comprising a substantially "L" shaped member, the longer leg of said member having a longitudinally extending bore therethrough for fitting over and accommodating said end, fitting at least one hole through said leg perpendicular to said bore and in alignment with said annular groove, fastening means adapted to be inserted within said hole to engage said end fitting at its annular groove, to positionally fix in an axial direction said adapter on said end fitting.

It is another object of the present invention to provide an adapter for attachment to a push-pull control cable wherein said substantially "L" shaped member is formed in a unitary member.

It is yet another object of the present invention to provide an adapter for attachment to a push-pull control cable wherein said shorter leg of said "L" shaped member has a centrally disposed radial opening therethrough for receiving a pin means disposed on a motor to which said push-pull control cable is operatively attached to fixedly attach said conduit to said motor.

It is yet another object of the present invention to provide an adapter for attachment to a push-pull control cable wherein said centrally disposed radial opening is substantially cylindrical and has two oppositely disposed slots emanating therefrom to receive differently configured pin means.

It is yet another object of the present invention to provide an adapter for attachment to a push-pull control cable wherein said adapter is provided with two series of holes through said longer leg, said holes disposed on said leg such that two of said holes are in alignment with said annular groove and tangentially thereto, each of said holes disposed on opposite sides of said end fitting, said fastening means, including a "U" shaped member, having each of its prongs inserted in each of said holes.

It is yet another object of the present invention to provide an adapter for attachment to a push-pull control cable wherein one of the prongs of said "U" shaped member is bent and thereby deformed toward the other of said prongs to interlock said "U" shaped member on said adapter.

It is yet another object of the present invention to provide an adapter for attachment to a push-pull control cable wherein said shorter leg of said "L" shaped member comprises a substantially cylindrically shaped barrel for registration in a substantially cylindrically shaped cavity on a mounting means, a clamping means engaging said adapter to thereby hold said barrel in said cavity.

It is yet another object of the present invention to provide an adapter for attachment to a push-pull control cable wherein said mounting means is on an engine being controlled by said push-pull control cable.

It is yet another object of the present invention to provide an adapter for attachment to a push-pull control cable wherein there is provided two of said cavities in a side-by-side relationship to accommodate two said barrels each attached to two push-pull control cables to anchor said conduit of said control cables to said engine.

It is yet another object of the present invention to provide an adapter for attachment to a push-pull control cable wherein said longer leg of said "L" shaped member is provided with an annular groove on its outer surface coaxial with said longitudinally extending bore and disposed on said leg adjacent to, and inwardly of, said shorter leg.

It is yet another object of the present invention to provide an adapter for attachment to a push-pull control cable wherein said push-pull control cable has standard end fittings attached to said conduit at each end thereof.

It is yet another object of the present invention to provide an adapter for attachment to a push-pull control cable which effectively and efficiently provides an attaching means of said push-pull control cable to a mounting means and is capable of being inexpensively manufactured and being simplistic in design.

It is yet another object of the present invention to provide an adapter for attachment to a push-pull control cable wherein said push-pull control cable may be manufactured using high volume automated manufacturing techniques.

Still other objects, features and attended advantages of the present invention will become apparent to those skilled in the art from a reading of the following detailed description of the preferred embodiments constructed in accordance therewith, taken in conjunction with the accompanied drawings wherein like numerals designate like parts in the several figures.

BRIEF DESCRIPTION OF THE DRAWINGS

FIG. 1 shows a standard S.A.E. push-pull control cable and an adapter therefor embodying the present invention affixed to a mounting plate, said push-pull control cable and its various fittings and the adapter shown partially in a phantom view.

FIG. 2 is the top view of the adapter of FIG. 1 removed from the push-pull cable.

FIG. 3 is the bottom view of the adapter of FIG. 2.

FIG. 4 is a sectional view of FIG. 2 taken along lines 4—4.

FIG. 5 shows interlocking insert pin used in connection with the adapter of FIG. 1.

DESCRIPTION OF THE INVENTION

Referring now to the figures and, in particular FIG. 1 through 5, there is therein shown an adapter 10 for attachment to a push-pull control cable 12.

The push-pull control cable may be of a standard variety wherein its various dimensional characteristics and materials are set forth in the Society of Automotive Engineering specifications. This type of cable is referred to and depicted in the Morse Controls Division of Rockwell International Corporation, Morse Marine Products Catalog 74, at Page 29, and designated Morse type "33-C" push-pull control cable. This type of push-pull control cable 12 is provided with a core member 14. Typically, the core member 14 is of solid wire having a 3/32 inch diameter. The core member 14 is slidably supported within a conduit 16 which may be wire reinforced having suitable plastic inner and outer liners. The inner liner (not shown) provides a smooth working and support surface for the slidably core member 14. The wire reinforcement encapsulated within the walls of the conduit 16 (not shown) insures strength and suitable flexibility for the conduit 16. The push-pull control cable 12 is further provided with standard end fittings 18 which are fixedly attached to each end of the push-pull control cable 12. The end fitting 18 is provided with an annular groove 19 which typically serves the function of effecting attachment of the push-pull control cable 12 and its conduit 16 to an apparatus or device. The end fitting 18 also has an extension swivably attached thereto at its end thereof. The end fitting extension 20 is swivably attached to the end fitting 18 by means of a flare 22 which rockably abuts an annular depression 24 swaged or otherwise suitably formed in the end fitting 18. The rockable or swivable attachment of the end fitting extension 20 to the end fitting extension 18 permits the conduit 16 to be moved with respect to the core member 14 during operation without impeding the slidable movement of core member 14. The core member 14 is provided with a core member extension 26 which is fixedly attached to the core member 14. The core extension 26 is provided at its operational end thereof with a threaded portion 28 to which an attaching device or means may be suitably threaded thereon.

A flexible boot 30 is attached to the end of the end fitting extension 18. The boot 30 protects the core member 14 and core extension 26 by keeping the inner workings of the push-pull control cable 12 isolated from the environment.

At this juncture, the push-pull control cable 12, as before described, is consistent with standard push-pull control configurations. The major thrust of the present invention is to make such standard push-pull control cables 12 generally universally adaptable to various engine transmissions and other similar configurations. This generally universal adaptability of the push-pull control cable 12 to the multiplicity of configurations in the field is accomplished by the before mentioned adapter 10. The adapter 10 may be formed from a suitable range of materials, including metals and alloys thereof, plastics and the like. The adapter 10 may be generally described as an "L" member having a longer leg 32 and a shorter leg 34 perpendicular to each other. The longer leg 32 of the adapter 10 has provided therein a longitudinally extending bore 36. This can best be seen in FIG. 4. The longitudinally extending bore 36 is of sufficient diameter to be fitted over and to accommodate the end fitting 18 of the push-pull control cable 12. It is to be noted that this is accomplished by removing a flexible boot (not shown) which is typically placed at the juncture of the end fitting extension 20 and end fitting 18. This flexible boot serves the same purpose as boot 30. That is, to seal and isolate the push-pull control cable from the surrounding environment. Obviously, boot 30 must also be removed to effect the placing of the adapter 10 on the end fitting 18. However, boot 30 is replaced after the adapter is placed in its desired position. It can be seen therefore that the adapter 10 may be placed on the push-pull control cable at its end fitting 18 without any major modification to the push-pull control cable assembly 12. The longer leg 32 is also provided with at least one hole 38 therethrough. Said hole 38 being substantially perpendicular to the longitudinally extending bore 36 and the hole 38 tangentially intersects the bore 36. It can be seen therefore that the hole 38 will also tangentially intersect the above noted annular groove 19. The unique intersection of the longitudinally extending bore 36 by the hole 38 and annular groove 19 provides an effective means of attaching the adapter 10 to the conduit 16 at the end fitting 18. The attachment is further effected by the insertion of an insert pin 40 which may be inserted in the hole 38 and which will mechanically interlock the adapter to the end fitting by abutting the walls of the annular groove 19. The insert pin may be substantially "U" shaped with each of its prongs being fitted into holes 38 oppositely disposed on each side of annular groove 19, each of said prongs abutting the walls of the annular groove 19. The insert pin 40 can be best seen in FIG. 5. The prongs of the insert pin 40 may be of such a length that they protrude beyond the body of the longer leg 32 when they are in their fully inserted position within the holes 38. The so protruding portions of the prongs of the insert pin 40 may be bent or otherwise deformed so as to further enhance the mechanical interlocking relationship between the adapter 10 and the end fitting 18. As before mentioned, the adapter 10 is provided with a shorter leg 34 which may be shaped in the form of a cylindrical barrel or the like. At this point it may be noted that the shorter leg 34 and the longer leg 32 may be formed as a unitary structure, that is, the adapter may be moulded in a one-piece structure. The shorter leg 34 or barrel may be provided with a centrally disposed radial opening 42 therethrough for receiving suitable attaching means such as a pin means disposed on a motor housing or the like to which push-pull control cable may be operatively attached. That is, a pin means may be inserted through the opening 42 to fixedly attach the adapter 10 to the motor housing and the like (not shown). A fastening means such as a snap ring (not shown) could be used to positionally fix the adapter 10 on such a pin means.

The opening 42 in the shorter leg 34 may be configured in different shapes and forms to accommodate different pin means on different motors, transmissions and the like. For that purpose, the opening 42 may be provided with two oppositely disposed slots 44 emanating therefrom to receive such differently configured pin means.

A more typical means of attaching the adapter 10 to a motor mount or the like is by placing the shorter leg 34 in a cavity having an inner surface complementary to the outer surface of such shorter leg 34. This form of attachment is shown in FIG. 1 wherein a mounting means 46 is fixedly attached to a motor transmission or other apparatus device 48 (only partially shown). The mounting bracket or means 46 may be fixedly attached to the device or apparatus 48 by bolts 50 or other suitable fastening means. It can be seen that the mounting bracket 46 is provided with a cavity 52 which is attached to receive the barrel or shorter leg 34 of the adapter 10. When the barrel or shorter leg 34 is so placed within the cavity 52 of the bracket 46, it may be operationally held in place therein by a clamping means 54 or the like which may be pivotally connected to the mounting bracket 46. In this regard, Mercury "650" engines are so provided with suitable bracket means 46 having clamping means 54 pivotally attached thereto. A multiplicity of cavities 52 may be provided on a single mounting to accommodate a multiplicity of adapter and control cable combinations thereon. For example, such cavities 52 may be provided in a side-by-side relationship to accommodate two barrels or shorter legs 34, each attached to two push-pull control cables 12 to anchor the conduit 16 of the control cable 12 to the engine at the end fittings 18.

The adapter 10 may be further provided on its outer surface to the annular groove 56 which may be coaxial with such longitudinally extending bore 36 and disposed on the longer leg 32 adjacent to and inwardly of the shorter leg 34. This annular groove 56 may further enhance the mechanical interlocking capability of adapter 10 to a mounting means (not shown) in which the annular groove may be embraced by such mounting means. This form of mounting means may be found on the Johnson 135 h.p. engine configuration.

The core extension 26, as before mentioned, is provided with the threaded portion 28 to which is attached suitable fastening member 58 which effects attachment of the core extension to the arm of a throttle device or the like 60. As before mentioned, the fastening member 58 is threaded upon and on the core extension 26 and locked in place by a nut and washer arrangement 62.

It can be seen from the above that the adapter 10 enables utilization of a standard S.A.E. push-pull control cable to different applications for different mounting configurations. This becomes of critical importance from a safety point of view as well as from an economic inventory control point of view.

I claim:

1. An adapter for attachment to a push-pull control cable, said control cable having a conduit slidably supporting a motion transmitting core, an end fitting attached to said conduit and coaxial therewith, said end fitting having an annular groove therein, said adapter comprising a substantially "L" shaped member, the longer leg of said member having a longitudinally extending bore therethrough for fitting over and accommodating said end fitting at least one hole through said leg perpendicular to said bore and in alignment with said annular groove, fastening means adapted to be inserted within said hole to engage said end fitting at its annular groove, to positionally fix in an axial direction said adapter on said end fitting.

2. An adapter for attachment to a push-pull control cable in accordance with claim 1 wherein said substantially "L" shaped number is formed in a unitary member.

3. An adapter for attachment to a push-pull control cable in accordance with claim 1 wherein the shorter leg of said "L" shaped member has a centrally disposed radial opening therethrough for receiving a pin means disposed on a motor to which said push-pull control cable is operatively attached to fixedly attach said conduit to said motor.

4. An adapter for attachment to a push-pull control cable in accordance with claim 3 wherein said centrally disposed radial opening is substantially cylindrical and has two oppositely disposed slots emanating therefrom to receive differently configured pin means.

5. An adapter for attachment to a push-pull control cable in accordance with claim 1 wherein said adapter is provided with two series of holes through said longer leg, said holes disposed on said leg such that two of said holes are in alignment with said annular groove and tangentially thereto, each of said holes disposed on opposite sides of said end fitting, said fastening means, including a "U" shaped member, having each of its prongs inserted in each of said holes.

6. An adapter for attachment to a push-pull control cable in accordance with claim 5 wherein one of the prongs of said "U" shaped member is bent and thereby deformed toward the other of said prongs to interlock said "U" shaped member on said adapter.

7. An adapter for attachment to a push-pull control cable in accordance with claim 1 wherein said shorter leg of said "L" shaped member comprises a substantially cylindrically shaped barrel for registration in a substantially cylindrically shaped cavity on a mounting means, a clamping means engaging said adapter to thereby hold said barrel in said cavity.

8. An adapter for attachment to a push-pull control cable in accordance with claim 7 wherein said mounting means is on an engine being controlled by said push-pull control cable.

9. An adapter for attachment to a push-pull control cable in accordance with claim 7 wherein there is provided two of said cavities in a side-by-side relationship to accommodate two said barrels each attached to two push-pull control cables to anchor said conduit of said control cables to said engine.

10. An adapter for attachment to a push-pull control cable in accordance with claim 1 wherein said longer leg of said "L" shaped member is provided with an annular groove on its outer surface coaxial with said longitudinally extending bore and disposed on said leg adjacent to, and inwardly of, said shorter leg.

11. An adapter for attachment to a push-pull control cable in accordance with claim 1 wherein said push-pull control cable has standard end fittings attached to said conduit at each end thereof.

12. An adapter for attachment to an end fitting on a conduit of a push-pull control cable which end fitting has an annular groove therein, the adaptor comprising an integrally formed "L" shaped member having a longer leg and a shorter leg comprising a cylindrically shaped barrel having equal transverse dimension with the longer leg, a longitudinal bore extending through the longer leg with a relatively large bore portion extending inward from one longitudinal end of the longer leg and a small bore portion extending inward from another longitudinal end of the longer leg and joining the large bore portion for receiving a push-pull control cable conduit end fitting in the large bore portion with a conduit extension extending through the small bore portion and extending from the adaptor through an end thereof adjacent the shorter leg, the longer leg having at least one hole therethrough transverse to the longitudinal bore with the hole tangentially intersectiing the bore in communication therewith, whereby the hole and the tangential communication of the hole with the bore align with an annular groove in the end fitting, a pin mounted in the hole and extending into the bore for engaging the annular groove of the end fitting, the shorter cylindrically shaped leg being provided with a centrally disposed radial opening having an axis transverse to a direction of the bore in the longer leg for receiving a pin through the opening in the shorter leg to fixedly attach the adaptor to an external device.

13. An adapter for attachment to a push-pull control cable in accordance with claim 12 wherein the shorter leg is integrally formed on one end of the longer leg adjacent the smaller portion of the bore.

14. An adapter for attachment to a push-pull cable in accordance with claim 12 wherein said centrally disposed radial opening is substantially cylindrical and has two oppositely disposed slots emanating therefrom to receive differently configured pin means.

15. An adapter for attachment to a push-pull control cable in accordance with claim 12 wherein said adapter is provided with two series of holes through said longer leg and on opposite sides thereof, said holes disposed on said leg such that two of said holes are in alignment with said annular groove and tangentially thereto, each of said holes disposed on opposite sides of said end fitting, said fastening means, and wherein the pin comprises a "U" shaped member, having parallel prongs, with each of its prongs inserted in each of said two holes.

16. An adapter for attachment to a push-pull control cable in accordance with claim 15 wherein one of the prongs of said "U" shaped member is bent and thereby deformed toward the other of said prongs to interlock said "U" shaped member on said adapter.

17. An adapter for attachment to a push-pull control cable, said control cable having a conduit slidably supporting a motion transmitting core, an end fitting attached to said conduit and coaxial therewith, said end fitting having an annular groove therein, said adapter comprising a member having a longitudinally extending bore therethrough fitting over and accommodating said end fitting, at least one hole through said member perpendicular to said bore and in alignment with said annular groove, fastening means adapted to be inserted within said hole to engage said end fitting at its annular groove, to positionally fix in an axial direction said adapter on said end fitting, said member having a mounting portion configured for engaging a mounting means disposed on a motor to which said push-pull control cable is operatively attached to fixedly attach said conduit and said end fitting to said motor.

18. An adapter for attachment to a push-pull control cable in accordance with claim 17 wherein said adapter is provided with two series of holes through said member, said holes disposed on said member such that two of said holes are in alignment with said annular groove and tangentially thereto, each of said holes disposed on opposite sides of said end fitting, said fastening means, including a "U" shaped member, having each of its prongs inserted in each of said holes.

19. An adapter for attachment to a push-pull control cable in accordance with claim 18 wherein one of the prongs of said "U" shaped member is bent and thereby deformed toward the other of said prongs to interlock said "U" shaped member on said adapter.

20. An adapter for attachment to a push-pull control cable in accordance with claim 17 wherein said portion comprises a substantially cylindrically shaped barrel for registration in a substantially cylindrically shaped cavity on the mounting means, a clamping means engaging said adapter to thereby hold said barrel in said cavity.

21. An adapter for attachment to a push-pull control cable in accordance with claim 20 wherein said mounting means is on an engine being controlled by said push-pull control cable.

22. An adapter for attachment to a push-pull control cable in accordance with claim 20 wherein there is provided two of said cavities in a side-by-side relationship to accommodate two said barrels each attached to two push-pull control cables to anchor said conduit of said control cables to said engine.

23. An adapter for attachment to a push-pull control cable in accordance with claim 17 wherein said member is provided with an annular groove on its outer surface coaxial with said longitudinally extending bore and disposed on said member adjacent to, and inwardly of, said mounting portion.

24. An adapter for attachment to a push-pull control cable in accordance with claim 17 wherein said push-pull control cable has standard end fittings attached to said conduit at each end thereof.

25. An adapter for attachment to an end fitting on a conduit of a push-pull control cable which end fitting has an annular groove therein, the adapter comprising an integrally formed member comprising a generally cylindrically shaped barrel, a longitudinal bore extending through the member with a relatively large bore portion extending inward from one longitudinal end of the member and a small bore portion extending inward from a second longitudinal end of the member and joining the large bore portion for receiving a push-pull control cable conduit end fitting in the large bore portion with a conduit extension extending through the small bore portion and extending from the adapter through the second end thereof, the member having at least one hole therethrough transverse to the longitudinal bore with the hole tangentially intersecting the large bore portion in communication therewith, whereby the hole and the tangential communication of the hole with the large bore portion align with an annular groove in the end fitting, a pin mounted in the hole and extending into the large bore portion for engaging the annular groove of the end fitting, the member being provided with a mounting portion at the second end of the member adjacent the small bore portion for receiving a mounting means to fixedly attach the adapter to an external device.

26. An adapter for attachment to a push-pull control cable in accordance with claim 12 wherein said adapter is provided with two series of holes through said member and on opposite sides thereof, said holes disposed on said member such that two of said holes are in alignment with said annular groove and tangentially thereto, each of said holes disposed on opposite sides of said end fitting and said fastening means, and wherein the pin comprises a "U" shaped member, having parallel prongs, with each of its prongs inserted in each of said two holes.

* * * * *